(12) United States Patent
Ikeno et al.

(10) Patent No.: US 7,800,786 B2
(45) Date of Patent: Sep. 21, 2010

(54) IMAGE READING DEVICE

(75) Inventors: Takahiro Ikeno, Aichi-ken (JP);
Tetsuya Kato, Aichi-ken (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 909 days.

(21) Appl. No.: 11/626,636

(22) Filed: Jan. 24, 2007

(65) Prior Publication Data

US 2007/0177224 A1 Aug. 2, 2007

(30) Foreign Application Priority Data

Jan. 27, 2006 (JP) ............... 2006-019014

(51) Int. Cl.
*H04N 1/40* (2006.01)
*H04N 1/04* (2006.01)

(52) U.S. Cl. ...................... 358/446; 358/474
(58) Field of Classification Search .............. 348/229.1, 348/363, 157, 311; 340/223.1; 358/500, 358/505, 509, 513, 516, 519, 400, 520, 443, 358/448, 447, 446, 474
See application file for complete search history.

(56) References Cited

U.S. PATENT DOCUMENTS

| 7,589,766 | B2 * | 9/2009 | Itani et al. | 348/229.1 |
| 2004/0047006 | A1 * | 3/2004 | Kato | 358/474 |
| 2005/0168610 | A1 * | 8/2005 | Kobayashi | 348/320 |
| 2005/0280718 | A1 * | 12/2005 | Une | 348/223.1 |

FOREIGN PATENT DOCUMENTS

| JP | H54-080024 | A | 6/1979 |
| JP | H58-006670 | A | 1/1983 |
| JP | H60-124176 | A | 7/1985 |
| JP | H04-358474 | A | 12/1992 |
| JP | 408050764 | * | 2/1996 |
| JP | 410210282 | * | 8/1998 |
| JP | 2002-300400 | A | 10/2002 |
| JP | 2005-020551 | A | 1/2005 |
| JP | 2005-217882 | A | 8/2005 |

OTHER PUBLICATIONS

Japan Patent Office; Notification of Reasons for Rejection in Japanese Patent Application No. 2006-019014 (counterpart to the above-captioned U.S. Patent Application) mailed Jan. 21, 2009.

* cited by examiner

*Primary Examiner*—Jerome Grant, II
(74) *Attorney, Agent, or Firm*—Baker Botts L.L.P.

(57) ABSTRACT

There is provided an image reading device, which comprises a photoreceptor unit having photoreceptors aligned in a line, and a signal output unit having output channels from which output signals of the photoreceptors are outputted. The output channels respectively correspond to regions into which the photoreceptors are divided. The image reading device further comprises an amplifier unit to amplify the output signals from the output channels, and a gain adjustment unit configured to use a maximum level of white signals outputted by the signal output unit as the output signals when the photoreceptor unit receives light from a white object to adjust a gain of amplification of the amplifier unit with respect to the output signals belonging to at least one of the regions other than a first region to which an output signal corresponding to the maximum level belongs.

5 Claims, 10 Drawing Sheets

ADJUST GAIN OF AMP 51 OF CH1 TO (ch3MAX − ch3MIN)/(ch1MAX − ch1MIN)

ADJUST GAIN OF AMP 52 OF CH2 TO (ch3MAX − ch3MIN)/(ch2MAX − ch2MIN)

ADJUST LIGHT AMOUNT SO THAT WHITE MAX IS EQUAL TO RefH.

ADJUST GAIN OF AMP 51 OF CH1 TO (ch2MAX − ch2MIN)/(ch1MAX − ch1MIN)

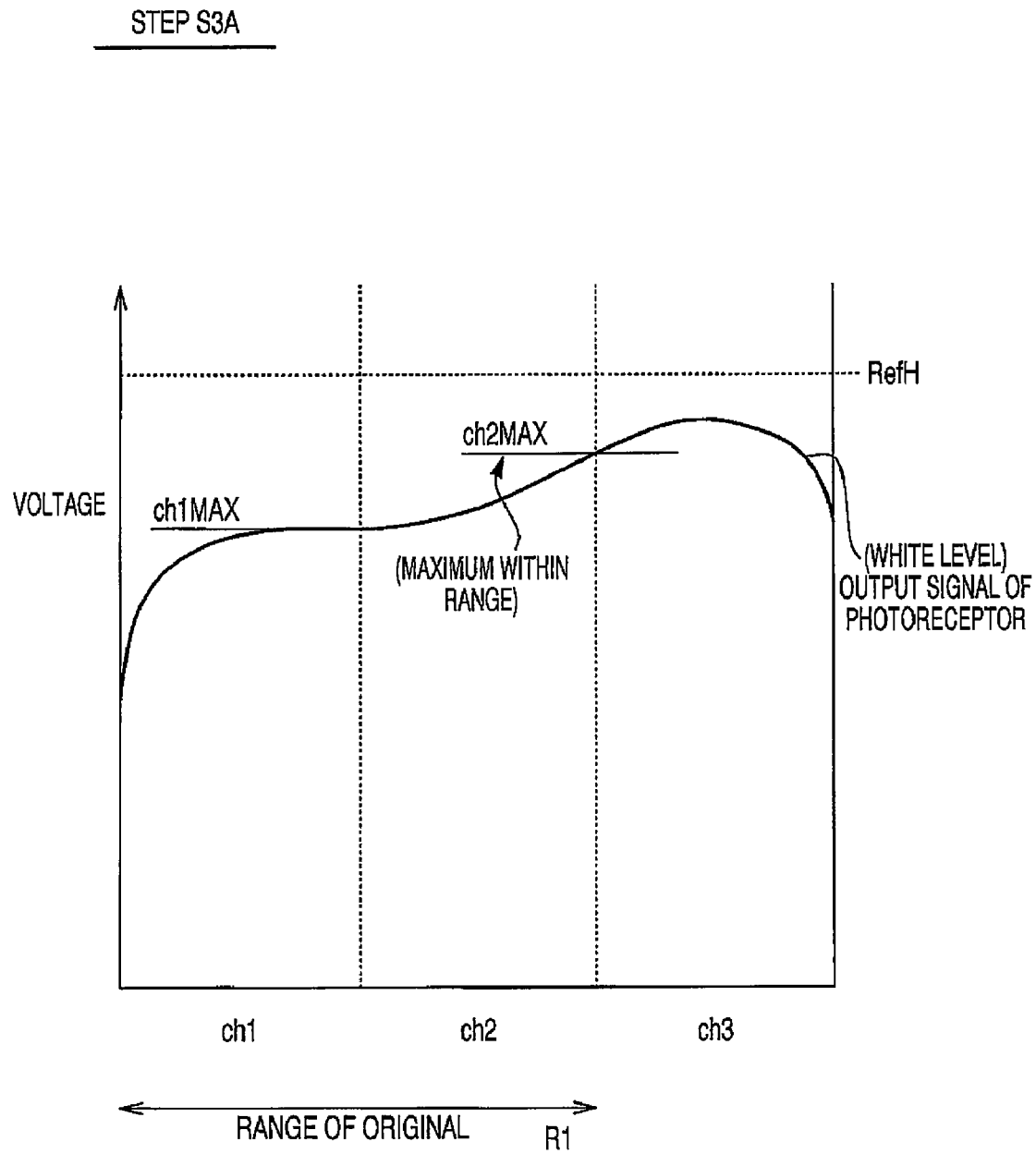

IMAGE READING DEVICE

CROSS-REFERENCE TO RELATED APPLICATION

This application claims priority under 35 U.S.C. §119 from Japanese Patent Application No. 2006-019014, filed on Jan. 27, 2006. The entire subject matter of the application is incorporated herein by reference.

BACKGROUND

1. Technical Field

Aspects of the present invention relate to an image reading device for reading an image from an original.

2. Related Art

A contact image sensor (CIS) is widely used as a reading device in a facsimile device, a copying device and the like. This type of contact image sensor is configured to execute a reading operation in accordance with a start signal and clock pulses from a control unit as disclosed in Japanese Patent Provisional Publications Nos. SHO 54-80024A, SHO 58-6670A, and SHO 60-124176A.

FIG. 10A is a conceptual illustration of a configuration of a contact image sensor unit. As shown in FIG. 10A, the contact image sensor unit includes a light guide 101 provided with a light source 103 such as an LED at its one end, and an image sensor 107. The light guide 101 diffuses light from the light source 103 in a main scanning direction to illuminate an original 105. The image sensor 107 formed to be elongated in the main scanning direction receives light reflected from the original 105.

Since it is difficult to emit light having uniform intensity in the main scanning direction from a light source side edge of the light guide 101 to a predetermined position, output signal levels of the image sensor 107 obtained when a white object is illuminated by the light guide 101 vary depending on a position on the image sensor 107 in the main scanning direction. For example, a maximum difference of 20% to 30% may be caused, on a percentage basis, between white signals which are output signals of the image sensor 107 when a white object is illuminated as shown in FIG. 10B. Therefore, a difference between the level of the white signal and a level of a black signal which is an output signal of the image sensor 107 obtained when the light guide 101 does not emit light becomes smaller in a region of the image sensor 107 having low white signals than that in another region of the image sensor 107 having high white signals. In this case, gray scale reproducibility also decreases in the region of the image sensor 107 having low white signals in comparison with another region of the image sensor 107 having high white signals.

SUMMARY

Aspects of the present invention are advantageous in that an image reading device capable of reading an image from an original without deteriorating gray scale reproducibility is provided.

BRIEF DESCRIPTION OF THE ACCOMPANYING DRAWINGS

FIG. 9 is an explanatory illustration for explaining adjustment of a light amount in accordance with the variation of the embodiment.

DETAILED DESCRIPTION

General Overview

Figure 1:
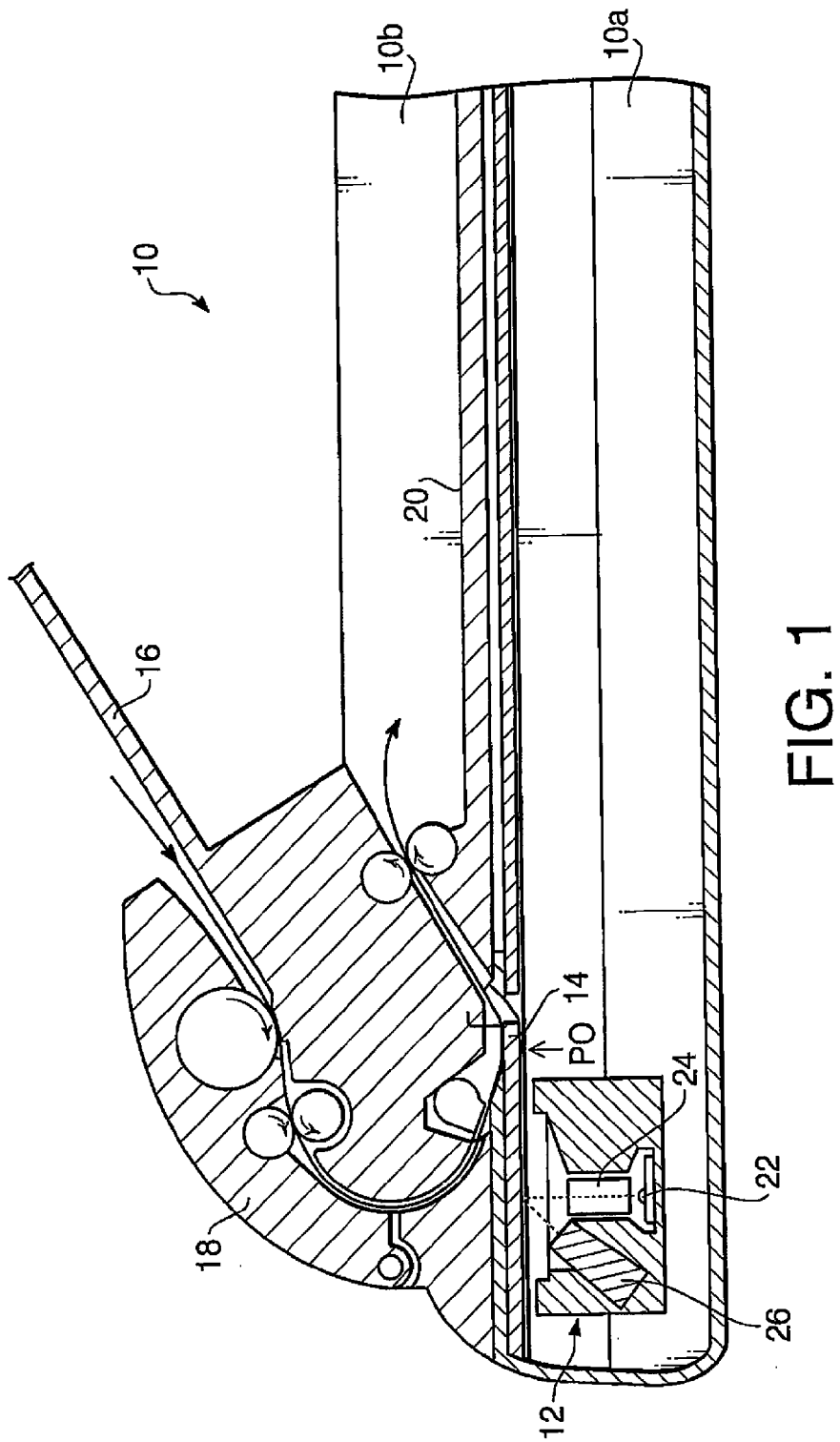
FIG. 1 is a side cross section of an image reading device according to an embodiment.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided an image reading device, which comprises a photoreceptor unit having a plurality of photoreceptors aligned in a line to receive light from an object, and a signal output unit configured to have a plurality of output channels from which output signals of the plurality of the photoreceptors are outputted. The plurality of output channels respectively corresponds to a plurality of regions into which the plurality of photoreceptors are divided. The image reading device further comprises an amplifier unit configured to amplify the output signals from the plurality of output channels of the signal output unit, and a gain adjustment unit configured to use a maximum level of white signals outputted by the signal output unit as the output signals when the photoreceptor unit receives light from a white object to adjust a gain of amplification of the amplifier unit with respect to the output signals belonging to at least one of the plurality of regions other than a first region to which an output signal corresponding to the maximum level belongs.

With this configuration, it is possible to adjust the gains of amplification in the regions other than the first region to which the maximum level of the white signals belongs, with reference to the maximum value of the white signals in the first region. That is, it is possible to bring the gray scale reproducibility of the regions other the first region into conformity with the gray scale reproducibility of the first region.

In at least one aspect, the amplifier unit is configured such that the gain is adjustable with respect to each of the plurality of output channels.

In at least one aspect, the gain of amplification is determined in accordance with a ratio of a difference between the maximum level of the white signals in the first region and a minimum level of black signals which belong to the first region and are outputted by the signal output unit as the output signals when the objected is not illuminated to a difference between a maximum level of the white signals in a second region of the plurality of regions to be amplified and a minimum level of the black signals in the second region.

By thus determining the gain of amplification, it is possible to effectively use the performance of the amplifier unit.

The maximum level of the white signals means a voltage value of the maximum white signal relative to the black signal. The maximum level of the black signals means a voltage value of the minimum block signal relative to the white signal. Therefore, if levels of the white signals are on a plus side with respect to levels of the black signals (e.g., output signals of a CMOS type image sensor), a maximum voltage value of the white signals is defined as the maximum level of the white signals and a minimum voltage value of the black signal is defined as the minimum level of the black signals. On the other hand, with regard to a photoreceptor device outputting white signals on a minus side with respect to the black signals, a minimum voltage value of the white signals is defined as the maximum level of the white signals, and a maximum voltage level of the black signals is defined as the minimum level of the black signals.

In at least one aspect, the gain of amplification is determined by:

$$(ch0MAX-ch0MiN)/(ch1MAX-ch1MIN)$$

where ch0MAX represents the maximum level of the white signals in the first region, ch0MIN represents the minimum level of the black signals in the first region, ch1MAX represents the maximum level of the white signals in the second region, and ch1MIN represents the minimum level of the black signals in the second region.

In at least one aspect, the image reading device further comprises a light acceptance range designation unit configured to designate a light acceptance range within which the photoreceptor unit is to receive the light from the object. In this case, the gain adjustment unit uses the maximum level of the white signals in the light acceptance range to adjust the gain of amplification.

By thus conducting the adjustment of the gain only for the light acceptance range, it is possible to adjust the gain with reference to the maximum level in the light acceptance range. Therefore, even if the maximum level of the white signals in the entire region of the photoreceptor unit does not lie in the light acceptance range, the gray scale reproducibility can be appropriately enhanced for the light acceptance range.

Embodiment

Hereafter, an embodiment according to the invention will be described with reference to the accompanying drawings.

FIG. 1 is a side cross section of an image reading device 10 according to an embodiment. The image reading device 10 has a flat bed mechanism as well as an ADF (Automatic Document Feeder). The image reading device 10 has a clam shell-like structure in which a cover 10b is attached to a flat bed 10a so as to be openable and closable with respect to the flat bed 10a.

In the flat bed 10a, various components including a CIS (Contact Image Sensor) 12 and a platen glass 14 are provided. In the cover 10b, various components including an original supply tray 16, an original feed unit 18, and an original output tray 20 are provided. In this embodiment, the image sensor 12 is formed of a MOS type image sensor. However, the image sensor 12 may be formed of a CCD type image sensor.

The image sensor 12 has a light guide 26 serving to illuminate an object (i.e., an original) placed at a reading position P0, and a lens (e.g., a SELFOC™ lens) 24 and a photoreceptor unit 22 having photoreceptors arranged in a line. The lens 24 converges light reflected from the original onto the photoreceptor unit 22 so that an image formed by the lens 24 can be read by the photoreceptor unit 22. The image sensor 12 is driven by a driving mechanism (not shown in FIG. 1) to be movable in a lateral direction in FIG. 1. When the original is read by the image reading device 1, the image sensor 12 is moved to the reading position P0 so that the photoreceptor unit 22 is situated beneath the original.

Figure 2A:
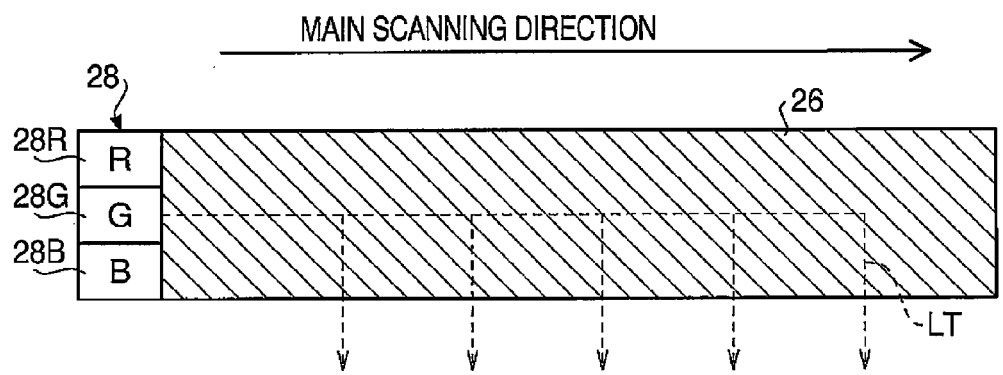
FIG. 2A illustrates a configuration of a light guide provided in the image reading device.
Figure 2B:
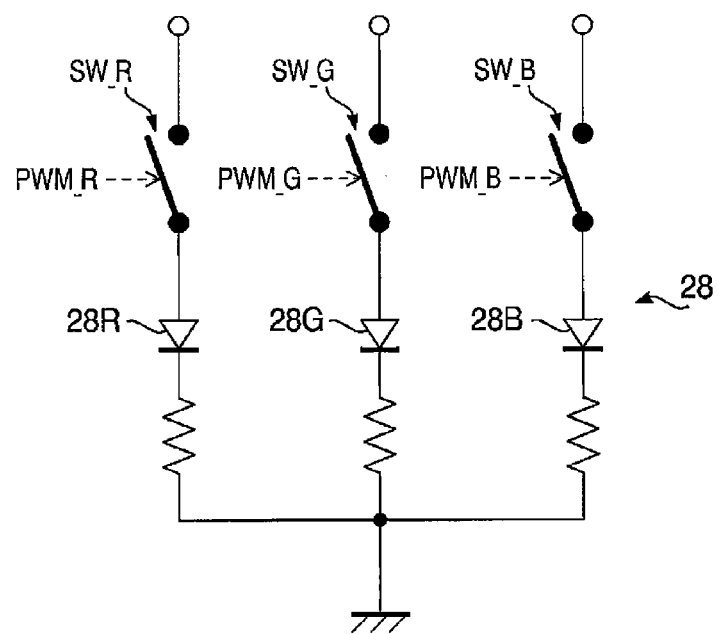
FIG. 2B is a circuit diagram for explaining control of LEDs serving as a light source in the image reading device.

FIG. 2A illustrates a configuration of the light guide 26. As shown in FIG. 2A, the light guide 26 has a form of a column elongated in a main scanning direction indicated by an arrow in FIG. 2A, and has a light source 28 formed of LEDs at its one end. The light guide 26 diffuses light LT emitted by the light source 28 in the main scanning direction to illuminate the original. The light source 28 includes LEDs 28R, 28G and 28B respectively corresponding to the primary colors. As shown in FIG. 2B, the LEDs 28R, 28G and 28B are respectively connected to switching devices (e.g., FETs) SW_R, SW_G, and SW_B so that the LEDs 28R, 28G and 28B are separately turned on or off by an ASIC 105 (see FIG. 3) through control signals PWM_R, PWM_G and PWM_B. The light amount of each of the LEDs 28R, 28G and 28B can be controlled by adjusting a pulse width of each of the control signals PWM_R, PWM_G and PWM_B.

Figure 3:
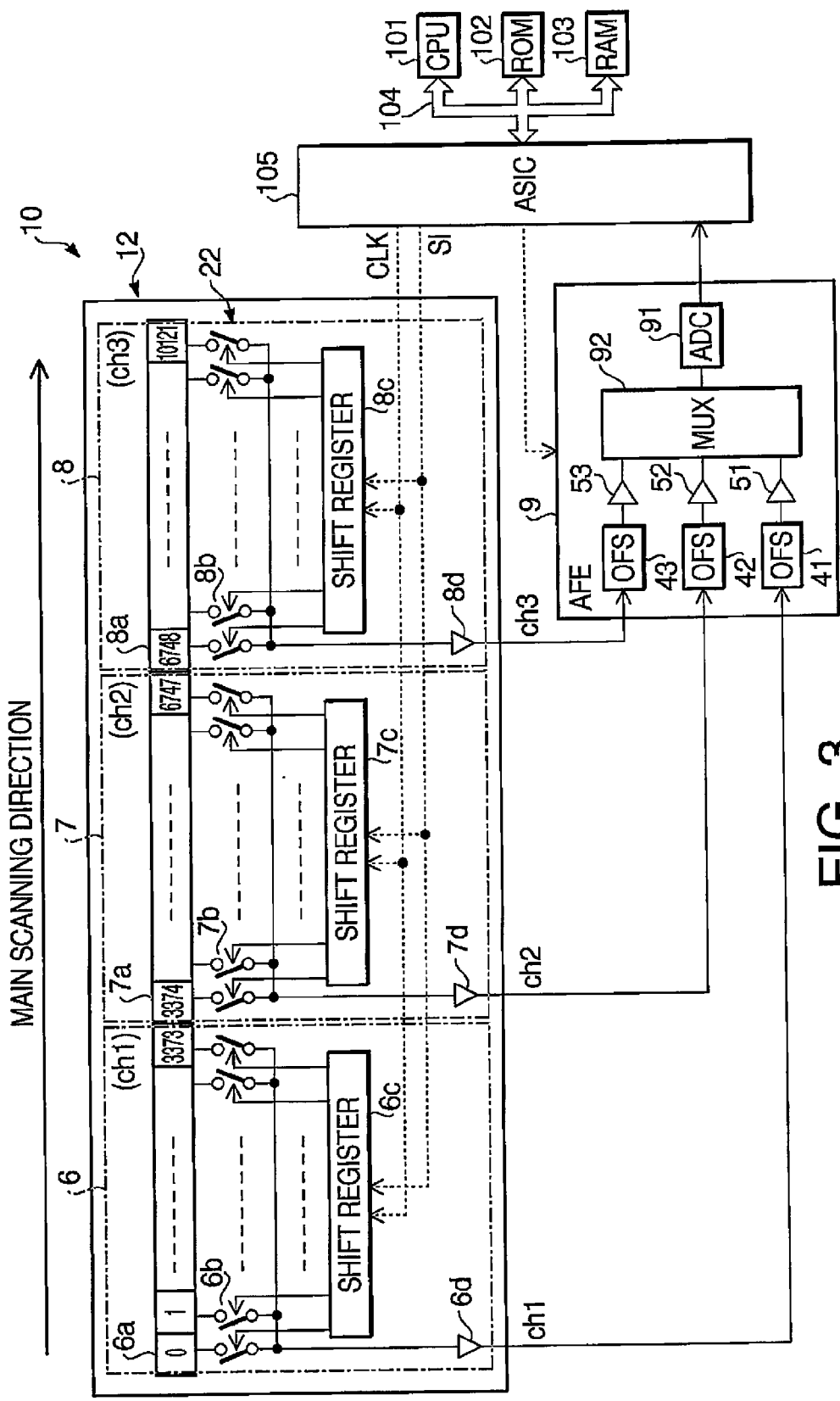
FIG. 3 illustrates a control system of the image reading device.

FIG. 3 illustrates a control system of the image reading device 10. As shown in FIG. 3, the image reading device 10 includes the image sensor 12, an analog front end (AFE) 9 serving to convert each of output signals respectively corresponding to pixels (photoreceptors) on the image sensor 12 into image data (i.e., digital data), and the ASIC (Application Specific Integration Circuit) 105 configured to execute various types of processing on the image data from the AFE 9 and to control the image sensor 12 and the AFE 9.

To the ASIC 105, a CPU 101 controlling functions of the image reading device 10, a ROM 102 storing programs to be executed by the CPU 101 and data used for the programs, and a RAM 103 used to temporarily store the image data processed in the ASIC 105 are connected via a bus 104. The photoreceptor unit 22 includes three reading units 6, 7 and 8 respectively corresponding to photoreceptor channels ch1, ch2 and ch3. In the image reading device 10, an image is read by the image sensor 12, and output signals from the photoreceptor channels ch1, ch2 and ch3 are inputted to the AFE 9. That is, the image sensor 12 is divided into a plurality of channels (i.e., a plurality of regions), and output signals are outputted from each of the regions.

Each of the reading units 6, 7 and 8 has a number of photoreceptors. That is, the reading units 6, 7 and 8 respectively have line sensors 6a, 7a and 8a each of which is arranged linearly in the main scanning direction.

The image sensor 12 starts to operate when receiving a start signal SI from the ASIC 105, and each of the reading units 6, 7 and 8 outputs signals of the photoreceptors in order where the photoreceptors are arranged in the main scanning direction.

Hereafter, the operation of each of the reading units 6, 7 and 8 is described. The reading unit 6 is configured to be capable of executing a reading operation in 1200 dpi for an A4 sheet. Specifically, the reading unit 6 includes the line sensor 6a having 3374 (#0 to #3373) photoreceptors arranged linearly in the main scanning direction, switches 6b each of which is located between a buffer amplifier 6d and each photoreceptor, and a shift register 6c configured to turn on the switches 6b sequentially in the main scanning direction. Each switch 6b is formed of, for example, a semiconductor switching element such as a MOS transistor.

To the shift register 6c, the start signal SI and a reading reference clock CLK are inputted. The shift register 6c operates to turn on the switches 6b sequentially in the main scanning direction in accordance with the clock CLK. Specifically, when the switch 6b corresponding to a first photoreceptor (#0) is turned on, the output signal of the first photoreceptor is inputted to the AFE 9 via the buffer amplifier 6d. Next, by turning on the switch 6b corresponding to a second photoreceptor (#1), the output signal of the second photoreceptor is inputted to the AFE 9 via the buffer amplifier 6d. Such a switching operation is repeated until the switch 6b corresponding to the last photoreceptor (#3373) is turned on.

Similarly to the reading unit 6, the reading unit 7 includes the line sensor 7a having 3374 (#3374 to #6747) photoreceptors arranged linearly in the main scanning direction, switches 7b each of which is located between a buffer amplifier 7d and each photoreceptor, and a shift register 7c configured to turn on the switches 7b sequentially in the main scanning direction. Similarly to the reading unit 6, the reading unit 8 includes the line sensor 8a having 3374 (#6748 to #10121) photoreceptors arranged linearly in the main scanning direction, switches 8b each of which is located between a buffer amplifier 8d and each photoreceptor, and a shift register 8c configured to turn on the switches 8b sequentially in the main scanning direction.

Each of the switches 6b and 7b is formed of, for example, a semiconductor switching device such as a MOS transistor. Since the reading units 7 and 8 have substantially the same functions as that of the reading unit 6, the explanations thereof will not be repeated.

The AFE 9 includes offset adjustment circuits (OFS) 41, 42 and 43, analog amplifiers 51, 52 and 53, a multiplexer (MUX) 92, and an analog-to-digital (A-D) converter 91. The offset adjustment circuits 41, 42 and 43 are respectively provided for the three channels ch1, ch2 and ch3. The analog amplifiers 51, 52 and 53 are respectively provided for the three channels ch1, ch2 and ch3. Specifically, the output signal of the reading unit 6 is inputted to the offset adjustment circuit 41, and then is inputted to the MUX 92 via the analog amplifier 51. The output signal of the reading unit 7 is inputted to the offset adjustment circuit 42, and then is inputted to the MUX 92 via the analog amplifier 52. The output signal of the reading unit 8 is inputted to the offset adjustment circuit 43, and then is inputted to the MUX 92 via the analog amplifier 53.

Each of the offset adjustment circuits 41 to 43 is configured to add an offset voltage to the output signal of the corresponding one of the reading units 6 to 8. Each of the analog amplifiers 51 to 53 is configured such that a gain for the output signal is adjustable. The gain of each of the analog amplifiers 51 to 53 is set by a gain register (not shown) so that the gain of each analog amplifier can be adjusted by assigning a setting value to the gain register.

The MUX 92 has three input channels and one output channel, and the three input channels of the MUX 92 are respectively connected to output terminals of the analog amplifiers 51 to 53, and the output channel of the MUX 92 is connected the A-D converter 91. The MUX 92 is configured to select one of the input channels so that one of the output signals from the analog amplifier 51 to 53 is sequentially inputted to the A-D converter 91. The A-D converter 91 converts the inputted analog signal to image data (i.e., digital data) so that the image data is inputted to the ASIC 105.

The ASIC 105 has a function of controlling the image sensor 12 and the AFE 9 in accordance with predetermined timing signals, a function of read image data from or write image data to the RAM 103, and a function of executing various types of image processing on the image data. That is, the ASIC 105 functions as a gain adjustment unit. In addition, the ASIC 105 is connected with operation keys and a LCD (Liquid Crystal Display) provided on an operation panel which is located on an outer surface of the image reading device 10. A user is able to operate the image reading device 10 through the operation panel.

When a reading operation is to be executed, a message requesting the user to designate a size of an original to be read (e.g., a size in the main scanning direction) is displayed on the LCD. From data inputted by the user through the operation panel, the ASIC 105 is able to designate the size of the original to be read (i.e., a light acceptance range on the photoreceptors of the image sensor 12).

Figure 4:
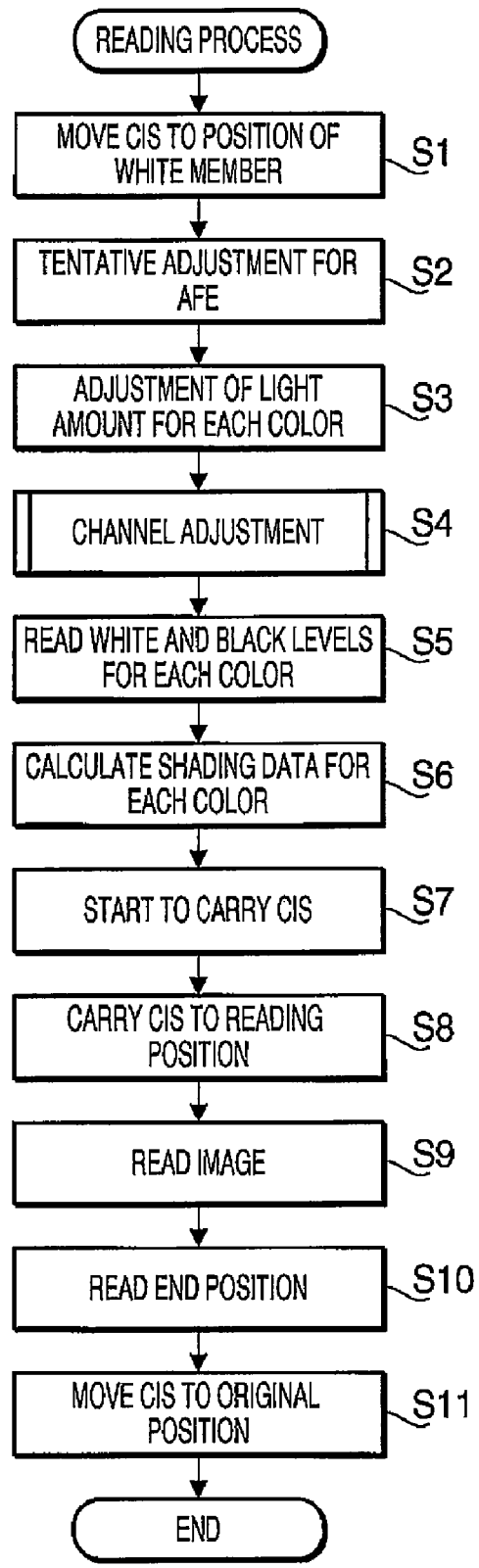
FIG. 4 is a flowchart illustrating a reading process executed by the image reading device to read an image from an original.

FIG. 4 is a flowchart illustrating a reading process executed by the image reading device 10 to read an image from an original. The reading process is executed under control of the CPU 101 of the image reading device 10. First, the CPU 101 controls the driving mechanism to move the image sensor 12 to a position beneath a white member provided on an inner surface of a top wall of the flat bed 10a (step S1) to perform white level adjustment which is described later. The white member is positioned near the reading position P0 and is formed to be elongated in the main scanning direction.

Next, the CPU 101 performs tentative adjustment for the AFE 9 (step S2) to set tentative settings of an offset value and a gain common to all the channels ch1 to ch3. Then, the CPU 101 adjusts the light amount of the light source 28 for each of the LEDs 28R, 28G and 28B (step S3). More specifically, the CPU 101 determines the pulse width of each of the control signals PWM_R, PWM_G and PWM_B so that the maximum value of voltage levels (i.e., a so-called white level) of the output signals from the image sensor 12 obtained when the white member is illuminated by corresponding one of the LEDs 28R, 28G and 28B matches the upper limit RefH of a voltage range within which the A-D converter 91 is able to appropriately perform voltage conversion.

Figure 7:
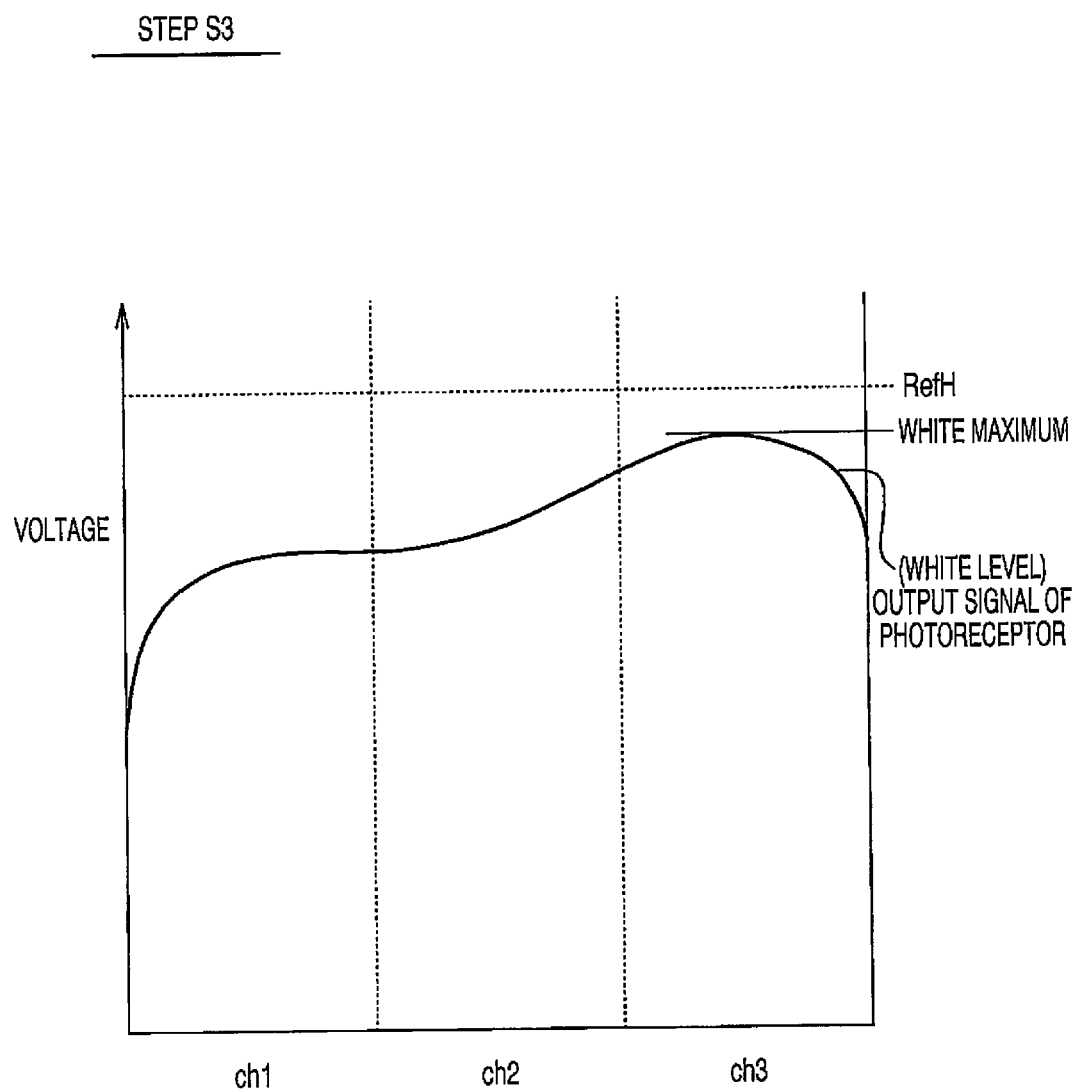
FIG. 7 is an explanatory illustration for explaining adjustment of a light amount in accordance with the embodiment.

FIG. 7 shows an example of a graph illustrating voltage levels of the output signals of the channels ch1, ch2 and ch3 in the image sensor 12. In FIG. 7, a vertical axis represents a voltage level, and a horizontal axis represents the photoreceptors. The white level is adjusted, for example, to be equal to the upper limit RefH.

More specifically, in step S3, the CPU 101 gives the maximum pulse width to the control signal (PWM_R, PWM_G or PWM_B). Then, if a pixel (i.e., an overflow pixel) of which while level is larger than the upper limit RefH is found, the CPU 101 decreases gradually the pulse width of the control signal. While decreasing gradually the pulse width of the control signal, the CPU 101 checks whether overflow pixels disappear. The pulse width obtained when the overflow pixels disappear is defined as a setting value for the pulse width of the control signal. Such adjustment is executed for each of the control signals PWM_R, PWM_G and PWM_B.

Figure 5:
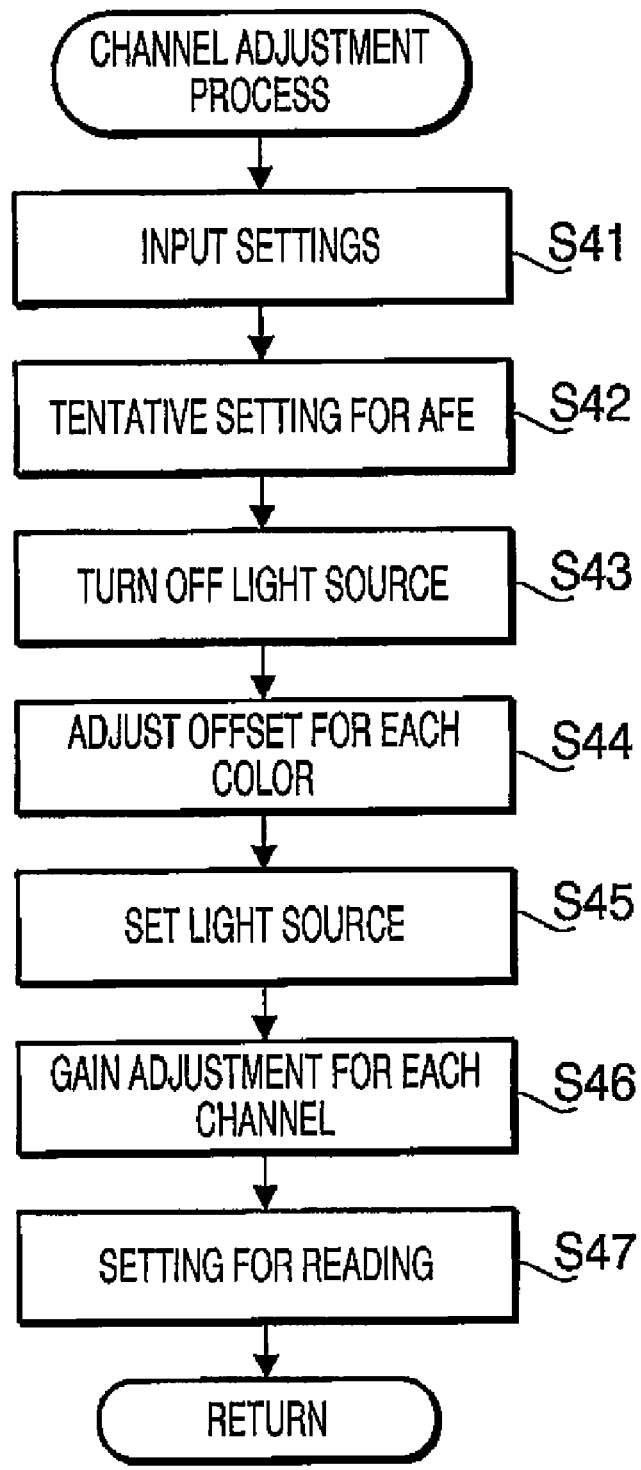
FIG. 5 is a flowchart illustrating a channel adjustment process executed in the reading process.

Next, in step S4, the CPU 101 executes a channel adjustment process for each of the channels ch1, ch2 and ch3. FIG. 5 is a flowchart illustrating the channel adjustment process. First, the CPU 101 inputs initial values of various settings including an offset value and a gain to the AFE 9 (step S41), and sets tentatively the APE 9 (step S42).

Next, the CPU 101 turns off the light source 28 (step S43), and adjusts the offset voltage of each of the offset adjustment circuits 41, 42 and 43 (step S44). In this case, the CPU 101 defines the minimum value of voltage levels (i.e., a so-called a black level) of the output signals, obtained from the reading unit (6, 7 or 8) when the light source 28 is off, as the offset voltage RefL. Such adjustment is performed for each of the photoreceptor channels (see FIG. 6).

Next, the CPU 101 sets the pulse widths of the control signals PWM_R, PWM_G and PWM_B to the values defined in step S3 (step S45). Then, the CPU 101 adjusts the gain of each of the analog amplifier 51 to 53 (step S46).

Figure 6:
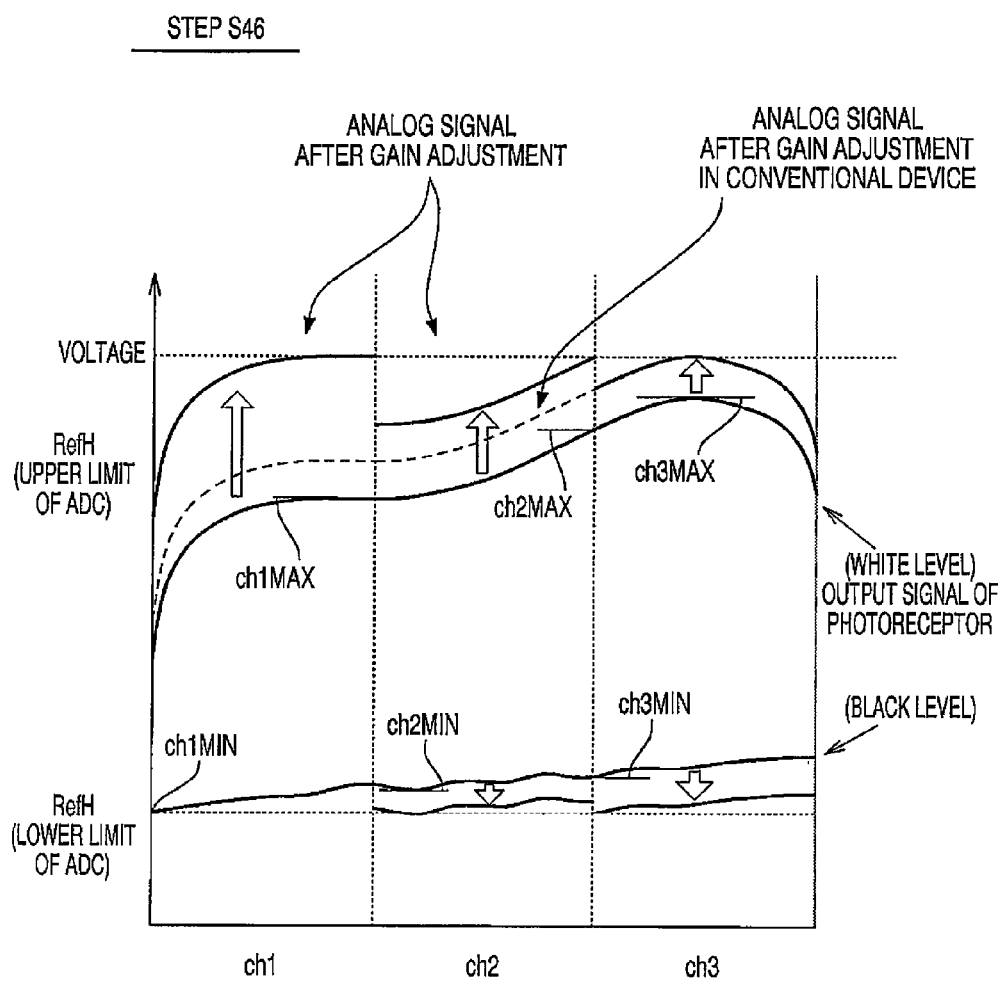
FIG. 6 is an explanatory illustration for explaining adjustment of a white level in accordance with the embodiment.

FIG. 6 is an explanatory illustration for explaining the above mentioned adjustment. As shown in FIG. 6, the gain of each of the analog amplifiers 51 to 53 is determined such that differences between the maximum values of the white levels of the channels ch1, ch2 and ch3 (see levels assigned symbols "ch1MAX", "cu2MAX" and "ch3MAX") becomes smaller. Such adjustment is performed for each of the primary colors (i.e., the LEDs 28R, 28G and 28B). In FIG. 6, ch1MIN, ch2MIN and ch3MIN represent minimum values of the black levels in the respective channels ch1, ch2 and ch3.

As shown in FIG. 6, if the maximum value of the white levels is in the channel ch3 (see the level ch3_MAX in FIG. 6), the gains of the other channels are determined based on the maximum level ch3MAX. That is, for the channel ch1, the gain is determined by (ch3MAX−ch3MIN)/(ch1MAX−ch1MIN). For the channel ch2, the gain is determined by (ch3MAX−ch3MIN)/(ch2MAX−ch2MIN). By thus adjusting the gains of the analog amplifiers 51 to 53, an analog signal generated in the entire region of each channel has the maximum level equal to RefH. Therefore, it is possible to achieve excellent gray scale reproducibility over the entire region of each photoreceptor channel.

Then, the CPU 101 sets the offset values and the gains determined in step S44 and S46 for a reading operation (step S47). Then, control returns to the reading process shown in FIG. 4.

Referring back to FIG. 4, the CPU 101 reads the white level and the black level for each of the red, green and blue colors (i.e., LEDs 28R, 28G and 28B) (step S5), and calculates shading data for each color (step S6). Then, the CPU 101 controls the driving mechanism to carry the image sensor 12 (step S12) to the reading position P0 (step S8) to read an image from the original (step S9). After the image sensor 12 is moved to the reading position P0 and the reading of the image is finished at a reading end position (step S10), the CPU 101 controls the driving mechanism to move the image sensor 12 to the original position (step S11). Thus, the reading of the image finishes.

Hereafter, a variation of the above mentioned embodiment is described. Since a structure and a control system of an image reading device are substantially the same as those of the above mentioned embodiment, the reference numbers used for the embodiment are also used in the following explanations. In the followings, only the feature of the variation is described.

Before step S1 of the reading process shown in FIG. 4, the image reading device 10 according to the variation displays, on the LCD, a message requesting a user to input a size (e.g., a size in the main scanning direction) of an original to be read. From data inputted by the user through the operation panel, the image reading device 10 is able to designate the size of the original to be read (i.e., a range of an original). Since the light received by photoreceptors within the width of the original is used for the image reading, the range of the original may be expressed as a light acceptance range of the image sensor 12.

When the image reading device 10 executes the adjustment of the light amount for each color in step S3 of the reading process, the image reading device 10 executes the adjustment of the light amount only for the white levels within the range of the original R1 (see FIG. 9). FIG. 9 is an explanatory illustration for explaining the adjustment of the light amount (step S3A). As shown in FIG. 9, assuming that a region including the channels ch1 and ch2 is defined as the range of the original R1, the pulse width of each of the control signals PWM_R, PWM_G and PWM_B is determined so that the maximum value of the white levels in the range of the original R1 (the level ch2MAX in FIG. 9) matches the upper limit RefH of the voltage range within which the A-D converter 91 is able to appropriately perform voltage conversion.

Figure 8:
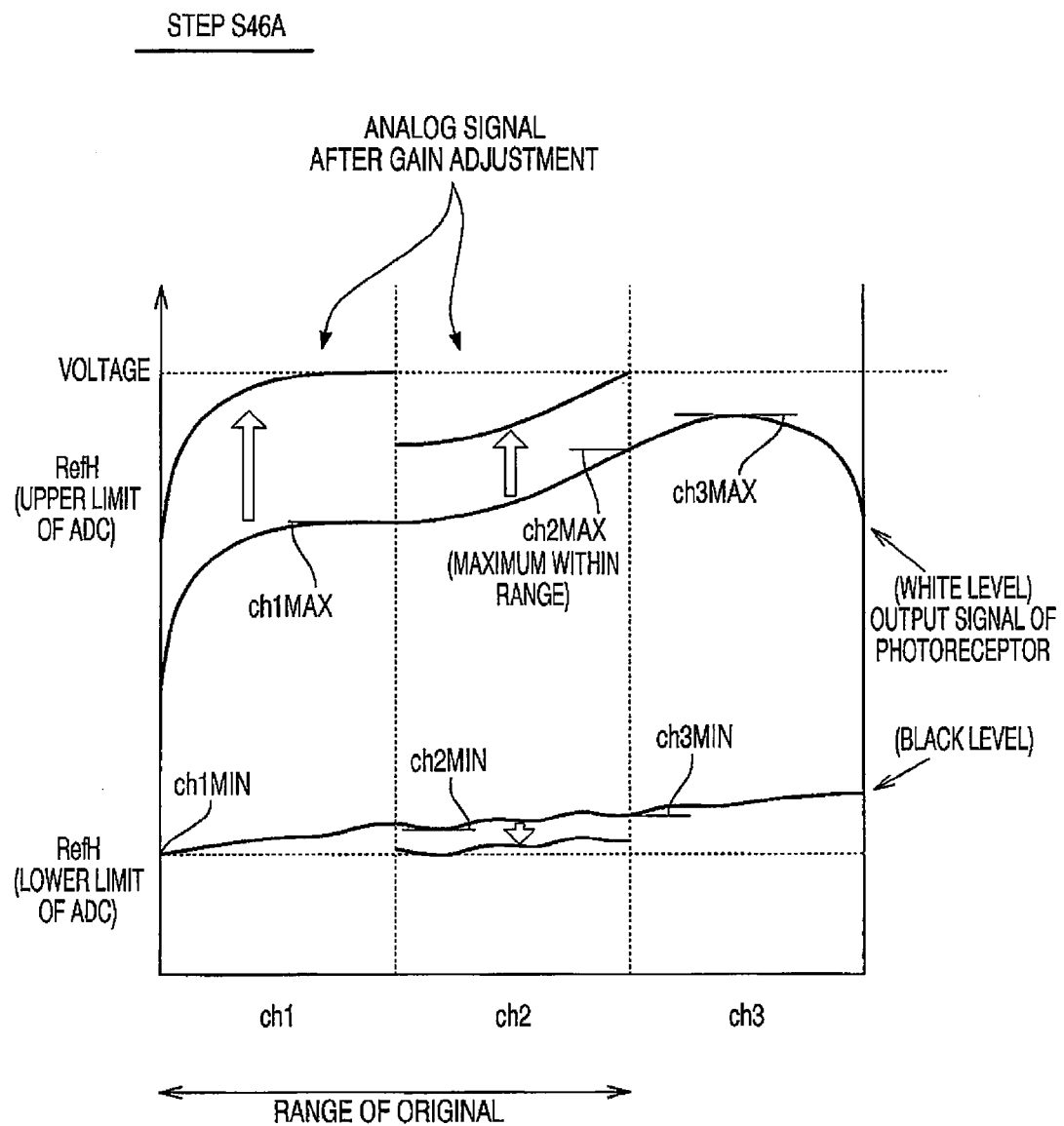
FIG. 8 is an explanatory illustration for explaining adjustment of a white level in accordance with a variation of the embodiment.
Figure 10A:
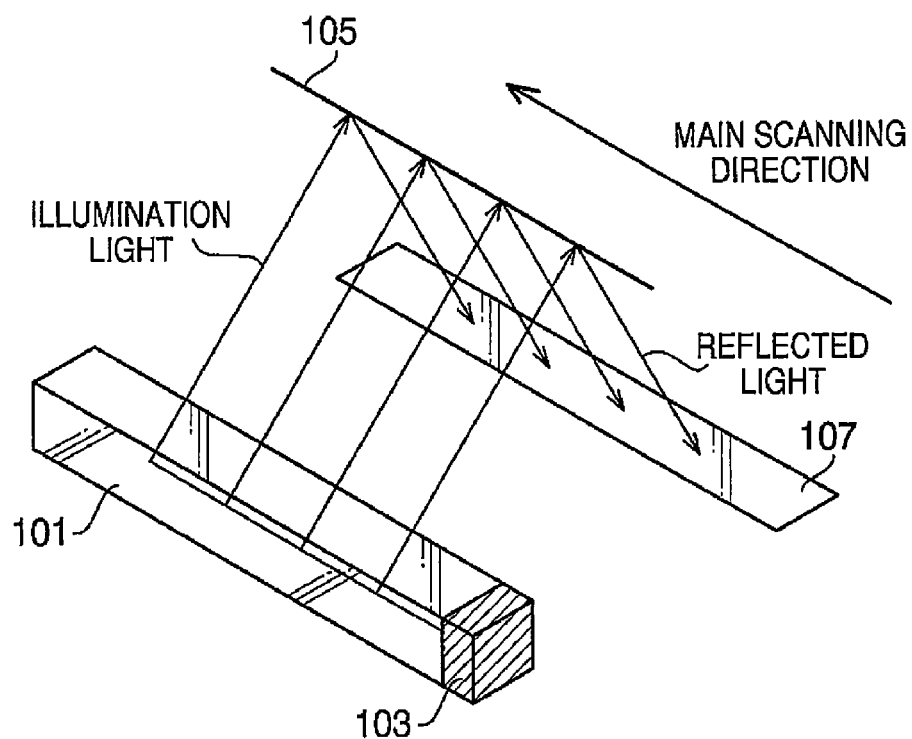
FIGS. 10A and 10B are explanatory illustrations for explaining a conventional image sensor unit.
Figure 10B:
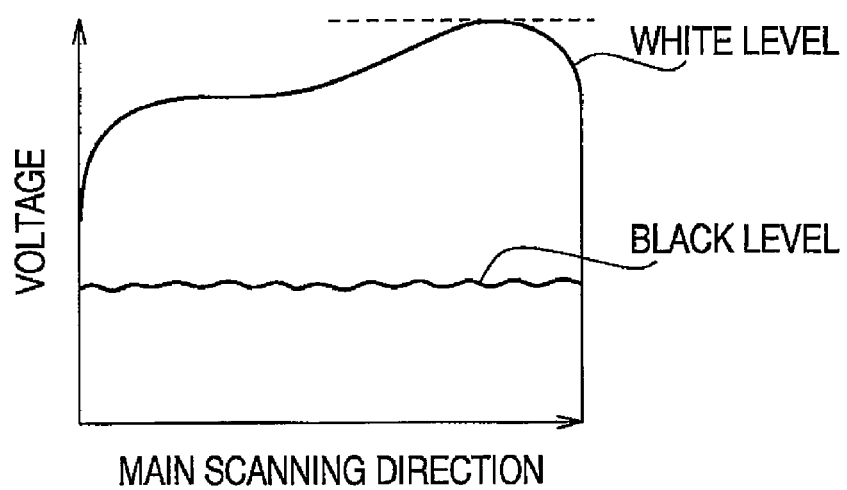

In step S46 of the channel adjustment process shown in FIG. 5, the image reading device 10 performs the gain adjustment only for the white levels within the range of the original R1. FIG. 8 is an explanatory illustration for explaining the adjustment of the white level (step S46A). In FIG. 8, a level ch1MAX is the maximum value of the whit levels within the photoreceptor channel ch1, a level ch1MIN is the minimum value of the black levels within the photoreceptor channel ch1, a level ch2MAX is the maximum value of the white levels within the photoreceptor channel ch2, and a level ch2MIN is the minimum value of the black levels within the photoreceptor channel ch2. As shown in FIG. 8, assuming that the region of the photoreceptor channels ch1 and ch2 is the range of the original R1 and the region of the photoreceptor channel ch3 is out of the range of the original R1, the gain is determined based on the maximum value of the white levels within the range of the original R1 (i.e., the level ch2MAX in FIG. 8). For the photoreceptor channel ch1, the gain is determined by (ch2MAX−ch2MIN)/(ch1MAX−ch1MIN).

The above mentioned variation has the advantage that the gray scale reproducibility can be enhanced within the range of the original particularly when the white levels of the photoreceptors within the range of the original are lower than the white levels of the photoreceptors outside the range of the original.

Although in the variation a boundary between the range of the original and the outside of the range of the original lies on a boundary between the photoreceptor regions ch2 and ch3, the boundary between the range of the original and the outside of the range of the original may lie at an intermediate position of one of the photoreceptor channels ch1, ch2 and ch3. For example, if the range of the original extends from the photoreceptor channel ch1 to an intermediate position of the photoreceptor channel ch3, the adjustment of the light amount and the gain may be executed for the entire part of each of the photoreceptor channels ch1 and ch2 and a part of the photoreceptor ch3 within the range of the original.

What is claimed is:

1. An image reading device, comprising:
  a photoreceptor unit having a plurality of photoreceptors aligned in a line to receive light from an object;
  a signal output unit configured to have a plurality of output channels from which output signals of a same color are outputted, the plurality of output channels respectively corresponding to a plurality of regions into which the plurality of photoreceptors are divided;
  an amplifier unit configured to amplify the output signals from the plurality of output channels of the signal output unit; and
  a gain adjustment unit configured to use a maximum level of white signals outputted by the signal output unit as the output signals when the photoreceptor unit receives light from a white object to adjust a gain of amplification of the amplifier unit with respect to the output signals belonging to at least one of the plurality of regions other than a first region to which an output signal corresponding to the maximum level belongs.

2. The image reading device according to claim 1, wherein the amplifier unit is configured such that the gain is adjustable with respect to each of the plurality of output channels.

3. The image reading device according to claim 1, wherein the gain of amplification is determined in accordance with a ratio of a difference between the maximum level of the white signals in the first region and a minimum level of black signals which belong to the first region and are outputted by the signal output unit as the output signals when the objected is not illuminated to a difference between a maximum level of the white signals in a second region of the plurality of regions to be amplified and a minimum level of the black signals in the second region.

4. The image reading device according to claim 3, wherein the gain of amplification is determined by: $(ch0MAX - ch0MIN)/(ch1MAX - ch1MIN)$ where $ch0MAX$ represents the maximum level of the white signals in the first region, $ch0MIN$ represents the minimum level of the black signals in the first region, $ch1MAX$ represents the maximum level of the white signals in the second region, and $ch1MIN$ represents the minimum level of the black signals in the second region.

5. The image reading device according to claim 1, further comprising a light acceptance range designation unit configured to designate a light acceptance range within which the photoreceptor unit is to receive the light from the object, wherein the gain adjustment unit uses the maximum level of the white signals in the light acceptance range to adjust the gain of amplification.

* * * * *